United States Patent [19]

Nix et al.

[11] Patent Number: 4,724,281

[45] Date of Patent: Feb. 9, 1988

[54] ELECTRICAL JUNCTION OR OUTLET BOX

[76] Inventors: Alfred L. Nix, 7917 201st Ave. Ct. E.; William D. Kullberg, 2828 206th Ave. Ct. E., both of Sumner, Wash. 98390

[21] Appl. No.: 874,656

[22] Filed: Jun. 16, 1986

[51] Int. Cl.$^4$ .............................................. H02G 3/12
[52] U.S. Cl. .................................... 174/53; 174/65 R
[58] Field of Search ................... 174/53, 65 R, 65 SS; 220/3.2, 3.3, 3.92, 3.94

[56] References Cited

U.S. PATENT DOCUMENTS

| | | | |
|---|---|---|---|
| 3,168,613 | 2/1965 | Palmer | 220/3.94 X |
| 3,619,476 | 11/1971 | Rasmussen | 174/53 X |
| 3,684,819 | 8/1972 | Wilson | 174/53 |
| 4,103,101 | 7/1978 | Maier | 174/65 R |
| 4,265,365 | 5/1981 | Boteler | 220/3.3 |
| 4,296,870 | 10/1981 | Balkwill et al. | 220/3.3 |
| 4,345,693 | 8/1982 | Balkwill et al. | 220/3.3 |
| 4,389,535 | 6/1983 | Slater et al. | 174/65 R |
| 4,494,815 | 1/1985 | Brzostek et al. | 174/66 X |
| 4,626,617 | 12/1986 | Rye | 174/53 |

Primary Examiner—Arthur T. Grimley
Assistant Examiner—David A. Tone
Attorney, Agent, or Firm—Keith D. Gehr

[57] ABSTRACT

The present invention is an electrical junction box of the type having side portions, a back portion, and an open face portion. A flange extends completely around the side portions. This flange is located sufficiently behind the open face of the box to leave a part of the side portions projecting forward of the flange. The projecting portion normally is equivalent in length to the thickness of the gypsum board, Sheetrock or other wall facing material being used. At least one wire or cable inlet extends outward from the side portions behind the flange for admitting electrical wiring into the junction box. These inlets will normally have a plurality of generally tubular apertures entering the interior of the box. Each aperture is originally sealed with a readily removable press-out diaphragm. In use, the box is mounted in a wall space to be covered with gypsum board or similar product so that the open face is essentially flush with the room-side surface of the gypsum board and the flange generally bears against the opposite side of the gypsum board. The flange and wire inlet apertures serve as caulk receiving surfaces to create seals and prevent air interchange between the room and wall space. Preferably the wire inlet apertures are angled forward to improve access for caulking. The flange is particularly useful in sealing the outlet box to a polyethylene vapor barrier.

5 Claims, 8 Drawing Figures

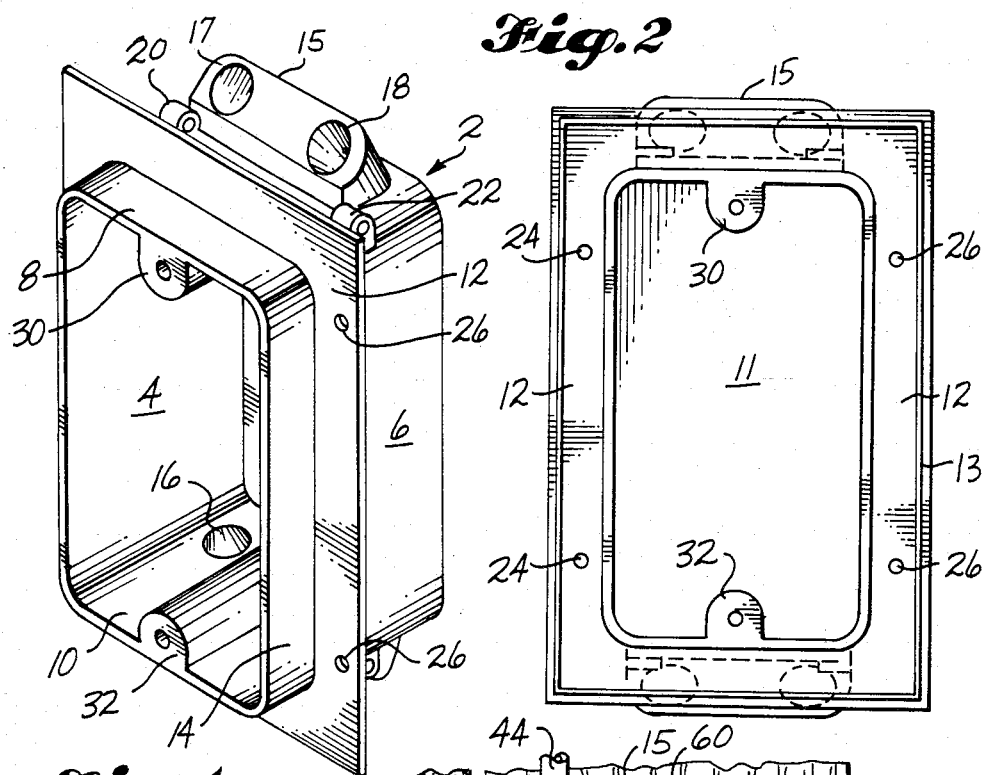
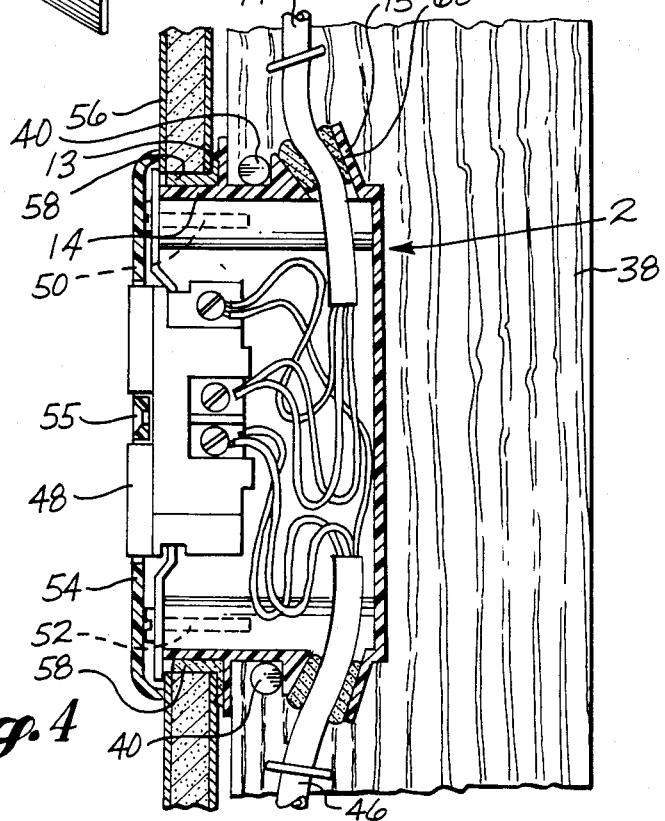

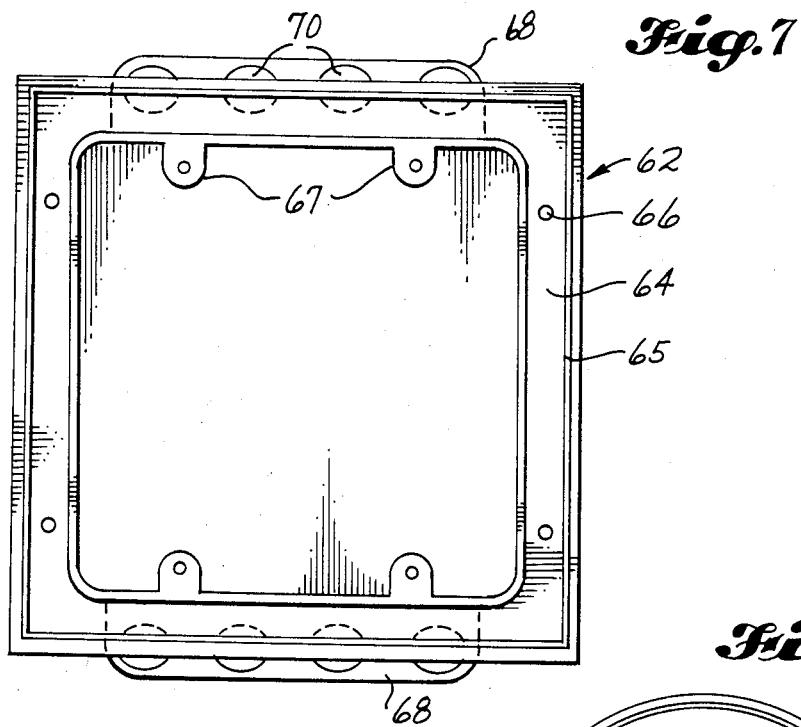
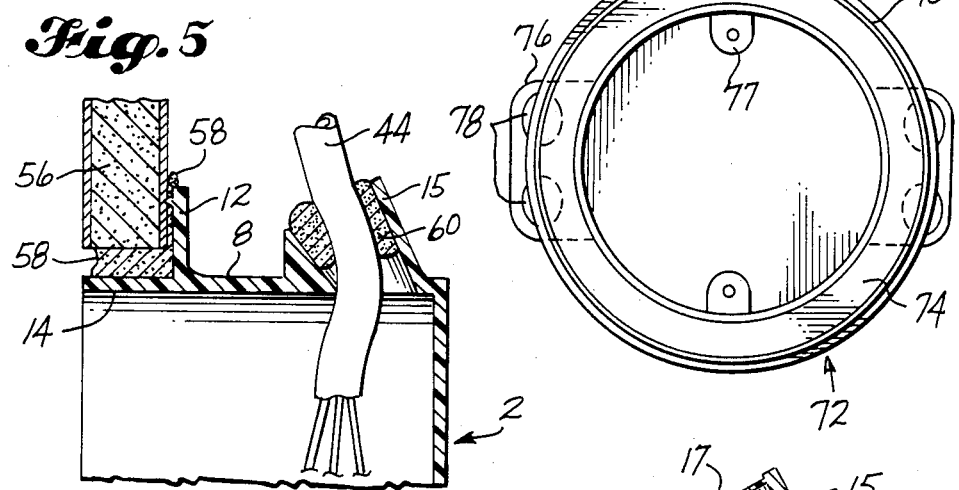
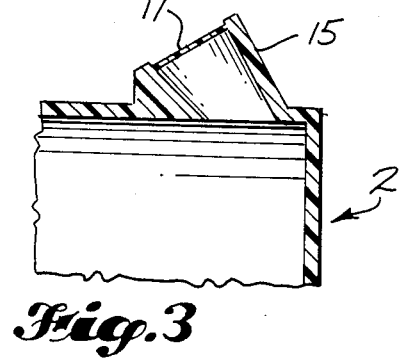

ELECTRICAL JUNCTION OR OUTLET BOX

BACKGROUND OF THE INVENTION

The present invention is an electrical outlet or junction box designed to prevent air interchange through the box between room and wall space.

One beneficial side effect of the drastic increase in energy costs of the past decade has been the increased emphasis on energy conservation. This has perhaps been most visible in transportation related industries where dramatic improvements have been made. However, improvements of equal magnitude have been made in many commercial, industrial, and residential buildings. If residential buildings can be taken as an example, building codes in many areas now require energy saving measures such as full wall and ceiling insulation, and double or triple pane window glass. Many innovative builders have adopted measures for energy conservation that go well beyond any required by building codes.

The major portion of heat lost from a building occurs by conduction through walls and ceilings when the interior temperature is higher than the outside environment. During the summer months, when air conditioning is frequently used, the opposite situation will prevail and the major source of heat entry will be through walls and ceilings. However, a very significant amount of energy loss occurs by convective air interchange between the interior and outside of a building. In some newer structures that are very well insulated the conductive losses have been reduced to the point that convective losses comprise the majority of the heat loss. Weather stripping around doors and windows has been used for many years and is an effective way of reducing air interchange. Many other entry points for outside air are not so well rcognized. As one example, relatively few builders caulk or seal the area between mud sills and foundation even though this is a major point of air interchange. Any opening cut into an inside wall provides another access point for cold winter or warm summer outside air. Openings for electrical outlet or junction boxes are prime zones for this type of air interchange.

Energy conscious builders today have gone to measures to reduce air interchange that would have been almost unthinkable even a decade ago. One of these is the use of polyolefin vapor barrier films placed under the typical gypsum board or "Sheetrock" used on interior walls. Conscientious builders will even attempt to seal electrical outlet boxes to this barrier film to insure absolutely tight construction. Unfortunately, outlet boxes have remained essentially unchanged for many years and have not evolved to accommodate this new demand which is now being placed upon them. Most of them are ill adapted for forming a tight seal that would prevent air flow through them.

A few inventors have recognized the above problem and attempted to deal with it. Balkwill et al. in U.S. Pat. Nos. 4,296,870 and 4,345,693 show a flanged plastic outer cover for an outlet box. The flanges, which may be made in accordion fashion, press against the back of the Sheetrock to form a seal. These plastic covers are made of light gauge material, typically about 1 mm in thickness. Nails can be readily driven through them so that the outlet boxes may be mounted conventionally. The inventors note that holes may be readily punched through the plastic outer box to allow entry of wires or cables into the junction box. Optionally, the area where these wires enter may be caulked.

Other builders have attempted to caulk around wire entry points and in the gap or juncture between the outside of the junction box and the adjacent Sheetrock. Similarly, before Sheetrock is applied, some builders using polyolefin barrier film will attempt to seal around electrical outlet boxes using a caulking material or duct tape. To date these measures have not been particularly satisfactory since they tend to be relatively slow and are frequently ineffective. As one example, it is extremely difficult to place an effective caulk seal around the entry point of a wire into a conventional outlet box. The necessary access to the area is marginal under the best conditions. There is a second problem as well. The edge of the junction box at the point of wire entry is quite thin and does not effectively retain most caulking compounds. Typically, they will sag or run by the action of gravity so that they flow out of the opening being sealed unless excessively large amounts are used.

Other earlier United States patents which have some structural relationship to the present invention but which were not attempts to solve the present problem are Maier, U.S. Pat. No. 4,103,101; Boteler, U.S. Pat. No. 4,265,365; and Slater et al. U.S. Pat. No. 4,389,535.

The electrical outlet box of the present invention overcomes the above problems and is well adapted for use on walls where a sealed, airtight construction is desired. It is particularly well adapted to the very recent approach to air tight construction in which the Sheetrock itself is sealed by caulking and the use of low air permeability paints.

SUMMARY OF THE INVENTION

The present invention is an electrical junction box especially adapted to prevent air leakage between room and wall space. The device comprises a box having side portions, a back portion and an open face portion. A flange is mounted essentially normal to and extends completely around the side portions. This flange is located to the rear of the open face portion of the box so as to leave a part of the side portions projecting forward from the flange. This forwardly projecting portion will normally have a length approximately equal to the thickness of the interior wall facing. Normally this distance will be about 12.7 mm (0.5 in.) or 15.9 mm (⅝ in) to correspond to the gypsum board or Sheetrock thicknesses most commonly used as interior wall and ceiling surfacing material.

The junction box will have at least one, and preferably a plurality, of wire or cable inlets. These extend outward from the side portions and are located behind the flange. Each cable inlet will have at least one generally tubular aperture which serves to pass electrical wire or cable into the interior of the box. Each of these apertures is normally sealed with a readily removable press-out diaphragm which can be conventionally removed as needed at the time of use.

The box is preferably mounted in the wall space so that the open face portion is essentially flush with the room-side surface of the wall facing material. The flange generally bears against the opposite side of the wall facing. The flange and the wire inlet apertures serve as caulk receiving and holding surfaces to create seals and prevent air interchange between the room and the wall space. Because of the significantly greater surface area present there is little tendency for the caulking compound to sag out of the sealed area.

Preferably the wire inlet apertures are angled forward toward the open face portion of the box to improve access for the tip of a caulking gun.

The flange may be sealed directly to a polyolefin or other type of vapor barrier, if this construction is employed.

Optionally, the flange may be used as a nailing surface to attach the outlet box to a stud or other wall structural member. The flange serves the additional purpose of accurately positioning the outlet box on the wall so that it projects the optimum distance beyond the surface of the stud to which it is attached.

It is the object of the present invention to provide an electrical junction box which may be readily and effectively sealed with common tools to prevent air interchange through the box between the room and the wall space.

It is another object to provide an electrical junction box whose forward projection beyond the stud surface may be readily and accurately controlled.

It is a further object to provide an electrical junction box which will effectively hold caulking compounds or other materials to seal cable entry points.

These and many other objects will become readily apparent to those skilled in the art upon reading the following detailed description taken in conjunction with the drawings.

BRIEF DESCRIPTION OF THE DRAWINGS

FIG. 1 is a perspective view of a rectangular junction box made according to the present invention.

FIG. 2 is a front elevation of the box of FIG. 1.

FIG. 3 is a detail, in section, of one of the cable entry apertures.

FIG. 4 is a vertical side elevation, in section, showing the junction box mounted on a conventionally constructed stud wall.

FIG. 5 is a detailed sectional elevation showing the seals at the wire entry points and at the interface with the gypsum board or Sheetrock.

FIG. 6 is a view similar to FIG. 5 showing an alternative wall construction with a plastic film vapor barrier.

FIGS. 7 & 8 are alternative square and round versions of the junction box.

DESCRIPTION OF THE PREFERRED EMBODIMENTS

The present invention can be best understood by reference to the drawings in which like numbers designate like parts throughout. An outlet box is generally shown at 2. This has side walls 4, 6, end walls 8, 10 and a rear wall 11. It should be noted that the terms "side walls" and "end walls" are relative and in many cases may be used interchangeably. A flange 12 completely surrounds the side and end portions and is positioned normal thereto. This flange is located back from the open front portion of the outlet box to leave a forward portion 14 which will generally have a length equal to the thickness of the interior gypsum board or Sheetrock. It will be evident that many other interior wall materials including wood paneling, plaster, etc. may be used as well. A narrow sealing ridge 13 may optionally be placed on the forward face of the flange to bite into the Sheetrock and form a tighter seal.

A major improvement in the present junction box is the use of cable inlet towers 15 to hold a caulking compound for providing an airtight seal around entering wires or cables. Normally a plurality of these will be located on the outlet box and each will normally have at least two apertures 16 leading to the interior of the box. These apertures are preferably wider on the cable inlet side than on the interior side and are closed by a pressout diaphragm 17 which may be readily removed with a screw driver or similar tool when the opening is needed for use. In FIG. 1 this closure has been removed from aperture 18. Conventional nailing lugs 20, 22 may be mounted on the box for attachment to a wall stud or other structural member. Alternatively, nailing holes 24, 26 may be provided in the flange for the same purpose. Bosses 30, 32 serve for attachment of the switch, outlet, or other electrical device within the junction box.

Reference may now be made to FIGS. 4, 5, and 6 which show how the outlet boxes are installed. In FIG. 4, box 2 is seen attached to a stud 38 by mounting nails 40. Electrical cables 44, 46 enter the box from top and bottom respectively. A plug outlet 48 is secured by mounting screws 50, 52. The assembly is completed by a cover plate 54 attached by screw 55. Sheetrock 56 is attached to the room side of stud 38. The volume between the Sheetrock and box is sealed by caulking material 58. Similarly, caulking compound 60 seals the space between incoming electrical cables 44, 46 and the apertures in cable inlet towers 15. In this manner a fully airtight assembly is created and there is no possibility of air interchange between the room and wall space through the outlet box.

FIG. 5 is a more detailed view of the sealing arrangement shown in FIG. 4. An alternative arrangement is shown in FIG. 6. Here polyethylene vapor barrier 39 is used over the interior face of the stud walls and sealed to flange 12 by a bead of caulking compound 58. With this construction it is not necessary to place a bead of caulk between the Sheetrock and the outlet box.

Outlet boxes of slightly different but still conventional shape are shown in FIGS. 7 and 8 respectively. FIG. 7 shows a square junction box 62 having a flange 64 with a sealing ridge 65 and nailing holes 66. Bosses 67 serve for mounting outlets or switches. Cable inlet towers 68 are mounted at top and bottom of the box. Each of these has four cable openings 70, only two of which ae numbered. In FIG. 8 a round junction box 72 has a flange 74 with an optional sealing ridge 75. Bosses 77 serve for mounting the electrical unit. Cable inlet towers 76 have openings 78 as described previously. In many cases a box of the type shown in FIG. 7 is molded in an octagonal configuration and this should be considered the full equivalent of a round box.

As an alternative to caulking entering electrical cables, split resilient grommets or plugs may be used to form seals at the inlet tower apertures.

Having thus shown the best mode known to the inventors of constructing and using the electrical outlet box of the present invention, it will be readily apparent to those skilled in the art that many changes can be made which will be the full mechanical equivalent of the structures described. Changes of this type should be considered to fall within the scope of the invention which is to be limited only by the following claims.

What we claim is:
1. An electrical junction box which comprises:
    a box means having side portions, a back portion, and an open face portion;

a flange means mounted essentially normal to and extending completely around the side portions, the flange means being located rearwardly from the open face portion so as to leave a part of said side portions projecting forward from the flange means; and at least one wire or cable inlet means extending outward from the side portions behind the flange means for admitting electrical wiring into the junction box, said inlet means being angled forward toward the open face portion of the box to improve caulking access, each inlet means having at least one generally tubular aperture entering the interior of the box, each aperture being sealed with a readily removable press-out diaphram;

whereby the box may be mounted in a wall space to be covered with a wall facing material so that the open face portion of the box is essentially flush with the room-side surface of the wall facing material and the flange means generally bears against the opposite side of the wall facing material, the flange and wire inlet apertures serving as caulk receiving surfaces to create seals and prevent air interchange through the junction box between the room and wall space.

2. The junction box of claim 1 in which the apertures are of greater cross sectional area at the wire entry end than at the interior end.

3. The junction box of claim 1 in which the flange serves as a mounting means to tie the box to a stud or other wall structural member.

4. The junction box of claim 1 in which the box means is generally rectangular.

5. The junction box of claim 1 in which the box means is generally circular.

* * * * *